United States Patent [19]

Schaier

[11] Patent Number: 4,935,132
[45] Date of Patent: Jun. 19, 1990

[54] DRAIN PIPE FILTER

[76] Inventor: Warren Schaier, 40 Meadowbrook Dr., Wrentham, Mass. 02093

[21] Appl. No.: 313,527

[22] Filed: Feb. 22, 1989

[51] Int. Cl.⁵ .................. B01D 17/02; B01D 29/06
[52] U.S. Cl. .................... 210/163; 210/316; 210/485; 210/502.1; 210/505
[58] Field of Search ............... 210/163–166, 210/170, 316, 317, 452, 485, 497.01, 497.1, 908, 482, 502.1, 505

[56] References Cited

U.S. PATENT DOCUMENTS

| | | |
|---|---|---|
| 699,176 | 5/1902 | Hough ................. 210/163 |
| 1,675,714 | 7/1928 | Koch .................. 210/163 |
| 2,246,012 | 6/1941 | Sanders ............... 210/163 |
| 2,263,259 | 11/1941 | Boosey ............... 210/164 |
| 2,615,526 | 10/1952 | Lane .................. 210/164 |
| 4,032,688 | 6/1977 | Pall .................. 210/497.1 |
| 4,240,908 | 12/1980 | Swain et al. .......... 210/497.1 |
| 4,261,823 | 4/1981 | Gallagher et al. ...... 210/164 |
| 4,358,371 | 11/1982 | Jameson et al. ........ 210/485 |
| 4,419,232 | 12/1983 | Arntyr et al. ......... 210/164 |
| 4,689,145 | 8/1987 | Mathews et al. ........ 210/170 |

FOREIGN PATENT DOCUMENTS

| | | | |
|---|---|---|---|
| 0057995 | 8/1982 | European Pat. Off. | ......... 210/497.1 |
| 0233307 | 2/1986 | German Democratic Rep. | ................. 210/497.01 |

*Primary Examiner*—Frank Spear
*Assistant Examiner*—Joseph Drodge

[57] ABSTRACT

A drain pipe filter which includes a wire cage, first and second circular rims and a plurality of oil absorbing elongated fibers. The filter is placed within a drain pipe and functions to absorb oily contaminants exiting a storm drain. The first and second circular rims which are formed of a flexible material are molded integrally with the wire cage providing a water tight seal and flexibility within the environment of the drain pipe. The oil absorbing elongated fibers are adhered to the wire cage in a plurality of locations and are also adhered to an inner conical wire which is integrally formed with the second rim.

8 Claims, 2 Drawing Sheets

DRAIN PIPE FILTER

BACKGROUND OF THE INVENTION

1. Field of the Invention

This invention relates to disposable filters which can be used in catch basin drain pipes.

SUMMARY OF THE INVENTION

The invention disclosed herein comprises a filter with first and second flexible rims, a wire cage and a series of absorbent elongated fibers which may be inserted into a catch basin drain pipe to absorb contaminants exiting the catch basin. The flexible rims are integrally molded to the wire cage and the elongated fibers are adhered thereto. The elongated fibers are flexible, hydrophobic and capable of absorbing contaminants. To increase the area of absorption an inner wire coil is molded into the inner surface of the second rim and an additional series of elongated fibers are adhered thereto.

BRIEF DESCRIPTION OF THE DRAWINGS

Further details are explained below with the help of the example(s) illustrated in the attached drawings in which.

DESCRIPTION OF THE PREFERRED EMBODIMENT

Figure 1:
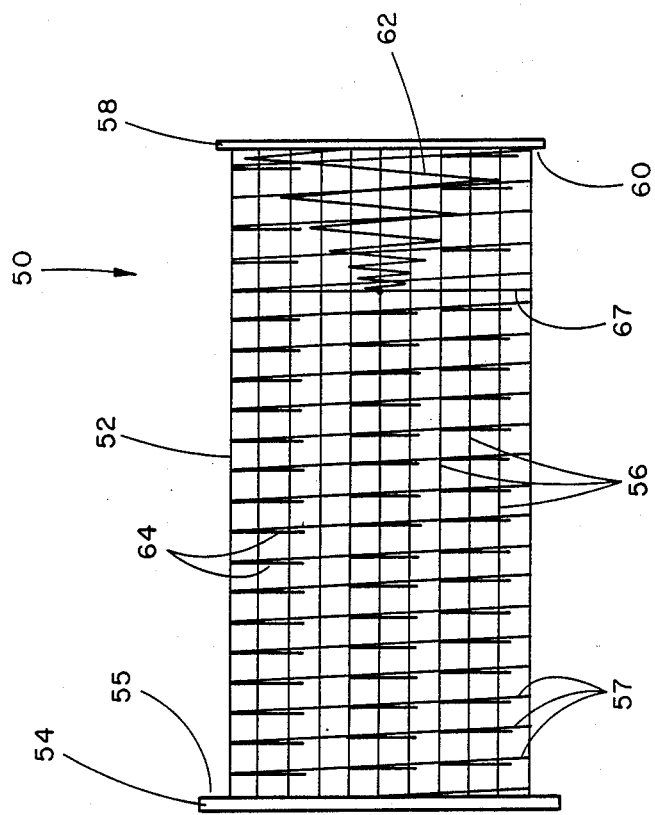
FIG. 1 is a side elevational view of the filter according to the present invention.

There is shown in the drawings a drain pipe filter 50 comprising a wire cage 52, a circular first rim 54, and a circular second rim 58.

Figure 2:
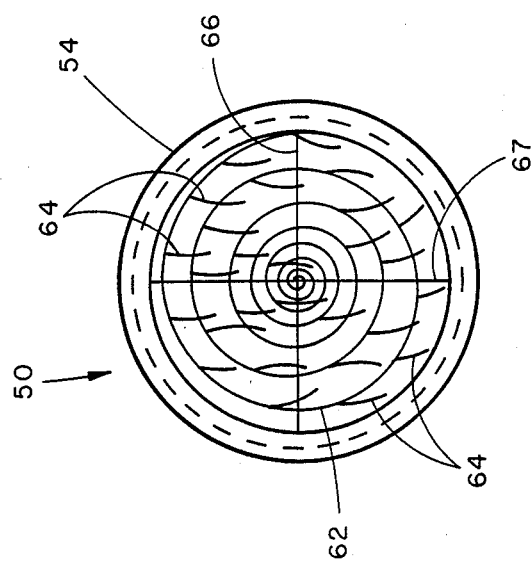
FIG. 2 is a front elevational view of the filter shown in FIG. 1.
Figure 3:
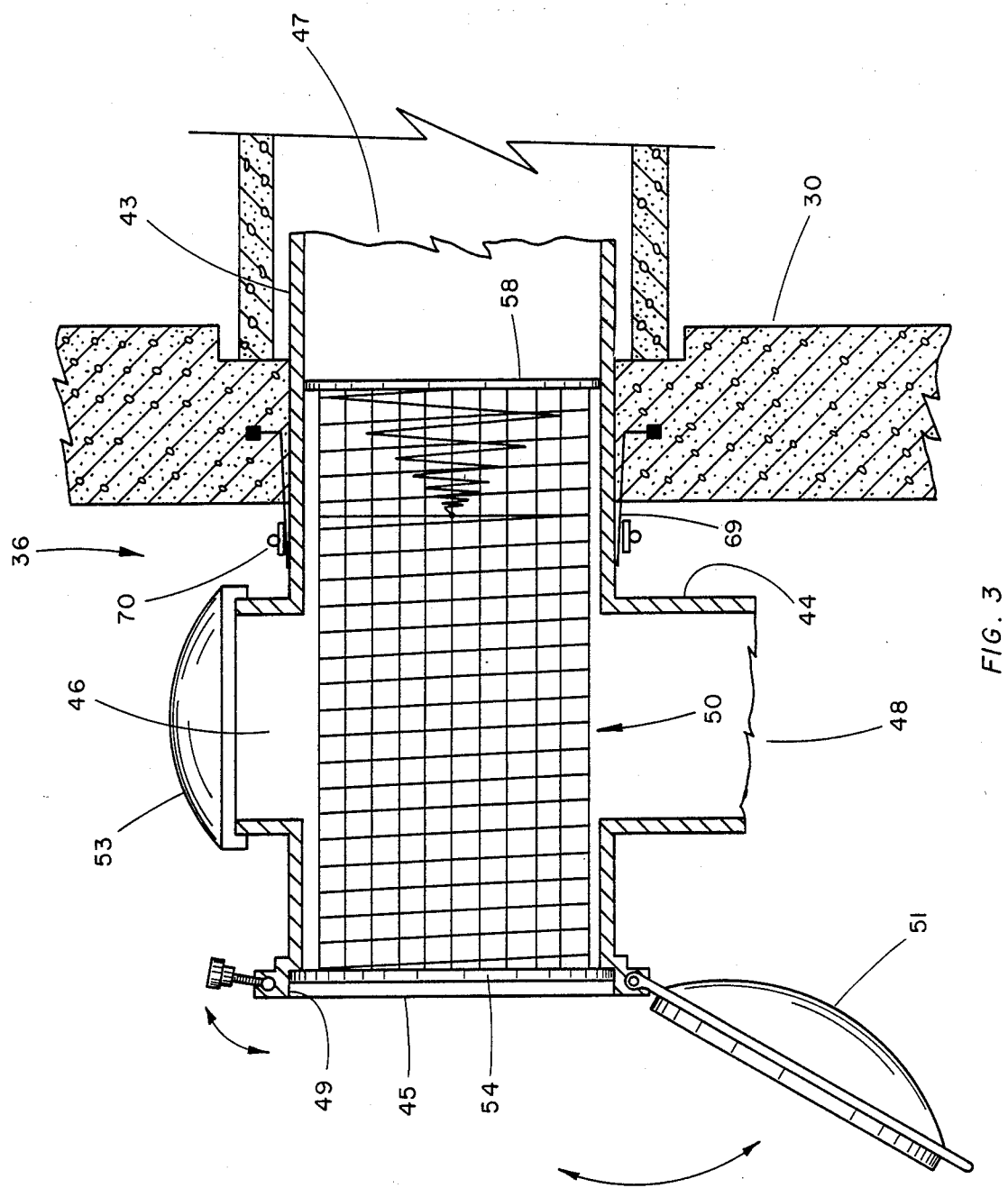
FIG. 3 is a cross sectional view of the drain pipe and a side elevational view of the filter in position.

As shown in FIGS. 1 and 2 the first rim 54 is substantially planar has a first inner surface 55 and is formed of a flexible material, such as rubber for example, to provide a water tight seal at the first opening 45 and flexibility in the filter 50 when it is mounted within the environment of a drain pipe 36, as illustrated in FIG. 3. The cage 52 includes a series of longitudinal ribs 56 and a unitary helical coil 57. The ribs 56 are in spaced parallel relationship to each other and the free terminal ends of the longitudinal ribs 56 on one side of the wire cage 52 are molded into the first inner surface 55 of the first rim 54 in right angle relationship therewith. The helical coil 57 is spot welded at a plurality of locations along the inner circumference of the ribs 56 and within the area defined by the longitudinal ribs 56.

The second rim 58 has a second inner surface 60 with an integrally molded conical wire 62. The second rim 58 is similar to the first rim 54 but has a smaller circumference and is in spaced, parallel relation with the first rim 54. The free terminal ends of the longitudinal ribs 56 on the side of the wire cage 52 remote from the first rim 54 are molded into the inner surface 60 in right angle relationship therewith. The conical wire 62 includes a first and second cross wires 66, 67 which are in a right angle relationship to each other, providing a cross like configuration. The cross wires 66 and 67 are welded at their mid-points to the apex of the conical wire 62 and are in right angle relation to the longitudinal axis of the cross pipe 43. The cross wires 66 and 67 each have first and second free terminal ends. After the conical wire 62 is positioned within the cavity of the filter 50, the first and second terminal ends of the cross wires 66 and 67 are welded to the inner surfaces of selected longitudinal ribs 56. The apex of the conical wire 62 is directed toward the first rim 54 and is spaced therefrom.

A series of oil absorbing elongated fibers 64 are adhered, at one of their free terminal ends, to a plurality of locations along the circumference of the conical wire 62. The other free end of the tentacles 64 is allowed to dangle freely. Additional series of oil absorbing tentacles 64 are adhered, in a similar manner, at a plurality of locations along each of the longitudinal ribs 56. The tentacles 64 are formed of a material which is flexible, absorbs oil, and is hydrophobic. Since the filter 50 is positioned in the path of the exiting water, the elongated fibers 64 will absorb most of any oily contaminants not separated by gravity in the storm drain chamber 40 (not completely illustrated), thereby substantially cleaning the water before discharge into the storm drain outlet.

As shown in FIG. 3 the drain pipe 36 comprises a cross pipe 43, and a drop pipe 44. The pipes 43 and 44 are tubular in configuration and may be formed of any suitable plastic material. Drop pipe 44 is in an integral right angle relationship with cross pipe 43 and extends down from and opens into the cross pipe 43. The cross pipe 43 includes a first opening 45, a second opening 46, and a third opening 47. A fourth opening 48 is provided at the free terminal end of the drop pipe 44. This aperture is open to allow storm water to flow in. The openings 45, 46, 47, and 48 are all circular in configuration. The cross pipe 43 includes first and second terminal ends. First opening 45 is formed at the first terminal end and has an outer rim 49 associated therewith.

Access to the inner chamber of the cross pipe 43 is gained through the first opening 45. A hinged cap 51 is used to cover the first opening 45 and seat the drain pipe filter 50. The first terminal end of the cap 51 is secured to the cross pipe 43 by a hinging means and the second terminal end is secured by two locking knobs. The third opening 47 is formed at the second terminal end of the cross pipe 43. The second opening 46 is formed at the top of the cross pipe 43 in close proximity to the first opening 45 and having a vertical axis in right angle relation to the longitudinal axis of the cross pipe 43 and in coaxial relation with the vertical axis of the drop pipe 44. The second opening 46 is used to inspect the inner chamber of the drop pipe 44 and is covered by a cap 53.

Storm water passes through the fourth opening 48 up through drop pipe 44 entering the chamber of cross pipe 43. The water will then exit out of cross pipe 43 through third opening 47 into the drain outfall system. The cross pipe 43 is positioned in a cradle formed in the wall of the storm drain 30. A circumferential rubber boot 69 is formed in integral relationship with the wall of the storm drain 30. A circumferential stainless steel clamp 70 is used to clamp the boot 69 to the external surface of the cross pipe 43.

What I claim is:

1. A removable-disposable drain pipe filter for use in a drain pipe,
   (a) the drain pipe filter comprising a wire cage and being positioned inside a drain pipe, a first rim, a second rim and a series of absorbent elongated fibers;
   (b) the wire cage being connected to the first and second rims and including a series of longitudinal ribs and a unitary helical coil;

(c) the absorbent elongated fibers being attached to the unitary helical coil of the wire cage.

2. The drain pipe filter as recited in claim 1 wherein:
(a) the first and second rims being formed of a flexible material.

3. The drain pipe filter as recited in claim 1, wherein:
(a) the drain pipe filter having an inner wire coil;
(b) the inner wire coil having a series of absorbent elongated fibers attached thereto.

4. The drain pipe filter as recited in claim 1, wherein:
(a) the absorbent elongated fibers being flexible;
(b) the absorbent elongated fibers being hydrophobic;
(c) the absorbent elongated fibers being adapted to absorb contaminants.

5. The combination of a drain, a drain pipe and a drain pipe filter, comprising:
the drain pipe filter being positioned inside the drain pipe, being removable and being disposable, the drain pipe filter comprising an outer wire cage, a first rim, a second rim and a series of absorbent elongated fibers;
(a) the first and second rim being formed of a flexible material;
(b) the wire cage being connected to the first and second rims;
(c) the absorbent elongated fibers being attached to the outer wire cage.

6. The combination as recited in claim 5, wherein:
(a) an inner wire coil being connected to a rim;
(b) the inner wire coil having a series of absorbent elongated fibers;
(c) the absorbent elongated fibers being attached to the inner wire coil.

7. The combination as recited in claim 5, wherein:
(a) the absorbent elongated fibers being flexible;
(b) the absorbent elongated fibers being hydrophobic;
(c) the absorbent elongated fibers being capable of absorbing contaminants;

8. The combination of a drain pipe and a drain pipe filter, comprising:
the drain pipe filter being positioned inside the drain, being removable and being disposable, the drain pipe filter comprising an outer wire cage, a first inner wire coil, a first rim, a second rim and a series of absorbent elongated fibers;
(a) the first and second rim being formed of a flexible material;
(b) the outer wire cage being connected to the first and second rims and to the first inner wire coil;
(c) the absorbent elongated fibers being attached to the outer wire cage; the first inner wire coil including a series of longitudinal ribs and a unitary helical coil.

* * * * *